(12) United States Patent
Zhu et al.

(10) Patent No.: US 11,807,774 B2
(45) Date of Patent: Nov. 7, 2023

(54) THOROUGHLY MODIFIED, FUNCTIONALIZED POLYMERIC HARD COATING MATERIAL FOR COATINGS, METHODS FOR SYNTHESIZING THE SAME AND APPLICATIONS THEREOF

(71) Applicant: Nano and Advanced Materials Institute Limited, Hong Kong (HK)

(72) Inventors: Yong Zhu, Hong Kong (HK); Jianping Han, Hong Kong (HK); Yubo Cheng, Hong Kong (HK); Shiwei Qin, Hong Kong (HK); Lanqi Huang, Hong Kong (HK); Chenmin Liu, Hong Kong (HK)

(73) Assignee: Nano and Advanced Materials Institute Limited, Hong Kong (HK)

( * ) Notice: Subject to any disclaimer, the term of this patent is extended or adjusted under 35 U.S.C. 154(b) by 420 days.

(21) Appl. No.: 17/114,426

(22) Filed: Dec. 7, 2020

(65) Prior Publication Data

US 2021/0189173 A1   Jun. 24, 2021

Related U.S. Application Data

(60) Provisional application No. 62/974,720, filed on Dec. 20, 2019.

(51) Int. Cl.
| | | |
|---|---|---|
| *C08F 2/46* | (2006.01) | |
| *C08F 2/50* | (2006.01) | |
| *C08G 61/04* | (2006.01) | |
| *C09D 183/04* | (2006.01) | |
| *C08J 5/18* | (2006.01) | |

(52) U.S. Cl.
CPC ............. *C09D 183/04* (2013.01); *C08J 5/18* (2013.01); *C08J 2383/04* (2013.01); *C08J 2423/22* (2013.01); *C08J 2475/04* (2013.01)

(58) Field of Classification Search
CPC ........ C09D 183/04; C09D 183/06; C08J 5/18; C08J 7/046; C08J 2383/04; C08J 2375/04; C08J 2475/04; C08J 2379/08; C08J 2483/07; C08J 2423/22; C08G 77/2614; C08L 83/00
USPC ................. 522/68, 6, 189, 184, 71, 1; 520/1
See application file for complete search history.

(56) References Cited

U.S. PATENT DOCUMENTS

| | | | |
|---|---|---|---|
| 7,786,209 B2 | 8/2010 | Carlini et al. | |
| 2011/0120940 A1 | 5/2011 | Allen et al. | |
| 2015/0141549 A1 | 5/2015 | Oshima et al. | |
| 2018/0237658 A1* | 8/2018 | Yoon ................... | C09D 183/06 |
| 2018/0282485 A1 | 10/2018 | Kuwana et al. | |
| 2020/0048495 A1 | 2/2020 | Galvez et al. | |
| 2020/0079897 A1 | 3/2020 | Wohl et al. | |

FOREIGN PATENT DOCUMENTS

| | | |
|---|---|---|
| CN | 1752165 A | 3/2006 |
| CN | 1834180 A | 9/2006 |
| CN | 101024751 A | 8/2007 |
| CN | 105778726 A | 7/2016 |
| CN | 106085203 A | 11/2016 |
| CN | 106459370 B | 11/2018 |
| CN | 109880495 A | 6/2019 |
| CN | 111454648 A | 7/2020 |
| KR | 20150121501 A | 10/2015 |
| KR | 20170041928 A | 4/2017 |
| TW | I658099 B | 5/2019 |

OTHER PUBLICATIONS

Choi, G. M. et al., "Flexible hard coating: glass-like wear resistant, yet plastic-like compliant, transparent protective coating for foldable displays", Advanced Materials, 2017, 29(19), 1700205, p. 1-7.
Zhang, K. et. al., "Transparent Omniphobic Coating with Glass-Like Wear Resistance and Polymer-Like Bendability" Angewandte Chemie International Edition, 2019, 58(35), p. 1-17.
Zhang, Kaka, "Transparent Omniphobic Coatings that are Flexible and Wear Resistant" Dissertation, 2019, pp. 1-119, https://qspace.library.queensu.ca/bitstream/handle/1974/26622/Zhang_Kaka_201909_PhD.pdf?sequence=2.
Chansomwong, Kwanchan, et al. "Facile preparation of wear-resistant and anti-fingerprint hard coating with chemisorption of fluorosilane by simple wet coating." Journal of Sol-Gel Science and Technology (2020): 1-9.
Office Action of corresponding China Patent Application No. 202011506404.X dated Dec. 3, 2021.

* cited by examiner

*Primary Examiner* — Jessica Whiteley
(74) *Attorney, Agent, or Firm* — Idea Intellectual Limited; Margaret A. Burke; Sam T. Yip

(57) ABSTRACT

The invention relates to a thoroughly modified, functionalized polymeric hard coating material represented by one of the following formulae for a bendable, transparent and photo/thermal curable coating film:

$[R^1R^aSiO_{3/2}]$  Formula (1);

$[R^1R^2R^aSiO_{3/2}]$  Formula (2).

This invention further relates to the synthetic method and application of the thoroughly modified, functionalized polymeric hard coating material. The thoroughly modified, functionalized polymeric hard coating material-containing composition for a coating exhibits higher surface hardness of at least 6H on flexible substrates, higher surface hardness of at least 9H on rigid substrates, and a certain degree of flexibility, with potential properties such as a light transparency of at least 85% and/or an antimicrobial effectiveness of at least 99%, and/or anti-scratch ability.

19 Claims, 4 Drawing Sheets

```
┌─────────────────────────────────────────┐
│  Preparing polyhedral oligomeric        │
│  silsesquioxane (POSS)                  │ 101
└─────────────────────────────────────────┘
                    ▼
┌─────────────────────────────────────────┐
│  Substituting the hydrophobic           │
│  functional groups of POSS by at        │ 102
│  least one hydrophilic or hydrophobic   │
│  group to obtain thoroughly modified,   │
│  functionalized POSS                    │
└─────────────────────────────────────────┘
```

FIG. 3

THOROUGHLY MODIFIED, FUNCTIONALIZED POLYMERIC HARD COATING MATERIAL FOR COATINGS, METHODS FOR SYNTHESIZING THE SAME AND APPLICATIONS THEREOF

CROSS-REFERENCE TO RELATED APPLICATIONS

The present application claims priority from U.S. provisional patent application Ser. No. 62/974,720 filed Dec. 20, 2019, and the disclosure of which is incorporated herein by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention generally relates to thoroughly modified, functionalized polymeric hard coating materials. Moreover, the present invention proposes various industrial applications of such hard coating materials, including transparent/matte films and anti-viral coatings.

BACKGROUND OF THE INVENTION

Hard coating materials are mainly divided into three groups: organic, inorganic and organic-inorganic hybrid materials. Organic materials, such as acryl, urethane, and melamine, exhibit higher flexibility and lower surface hardness. In contrast, silicon-based inorganic materials show higher surface hardness and lower flexibility. Both organic and inorganic materials have their own limitations, thus, the combination of these two materials, namely organic-inorganic hybrid materials, has attracted widespread attention all over the world. Siloxanes are one of the fastest growing materials in the field of materials research and coating development. The versatility of siloxanes allows the formation of siloxane hybrids with various organic polymers.

CN Patent Application Publication No. 1834180[1] discloses an anti-scratch hard coating and its preparation methods, which used a combination of organic silicon monomer and various salines (e.g. tetraethyl orthosilicate, methyl trimethoxysilane, γ-glycidoxypropyl trimethoxysilane, γ-methacryloxypropyl trimethoxysilane) as a curable composition, and the cured layer has a hardness in a range of 4 to 6H.

CN Patent Application Publication No. 1752165[2] discloses a transparent anti-wear paint with high hardness. The coating composition is prepared from various alkoxyailanes (e.g. tetraalkoxysilane, trialkoxysilane and dialkoxysilane) through acid-catalyzed hydrolysis and polymerization.

Chansomwong et al.[3] discloses a fluoro-treated epoxysiloxane hybrid hard coating with good abrasion resistance. In briefly, the coating is made by using plasma and TEOS-silica primer treatment, as well as thermal annealing to provide strong chemical bonding between fluorosilane on the hard coating. The hydrophobic surface shows high wear resistance and durability, and retains a high water contact angle (WCA).

Polyhedral oligomeric silsesquioxane (POSS) is a special type of siloxane with an empirical formula $(RSiO_{1.5})$, consisting of three-dimensional, rigid inorganic cores (Si—O cages) and flexible organic coronae, and it can be deemed as the smallest silica particles. At present, POSS has been paid on more attentions as a new class of nanofillers for the preparation of organic-inorganic hybrid materials.

CN Patent Application Publication No. 101024751[4] discloses a manufacturing process of acrylate POSS-containing UV curable composition. After UV solidification, the coating has a hardness of 6H.

TW Patent No. 1658099[5] provides preparation methods of various POSS and their application thereof. For example, the curable composition with epoxy-contained POSS has a hardness in a range of 3H-9H.

Zhang et al.[6] found that by using PDMS modified glycidyl POSS to incorporate a PDMS into a coating, an anti-smudge coating with high flexibility and wear resistance can be obtained.

However, extensive application of all of the aforementioned POSS is still limited because of its difficulty aristing from the unity of functional groups. Hence, there is a need to provide a novel modified POSS which can exhibit various properties, including hydrophilicity from hydrophilic modifier, improved flexibility from extra chain-extension modifier, anti-smudge from soft silicon chain modifier and so on. For example, common POSS contain a large amount of hydrophobic groups, making them hard to be well dispersed in hydrophilic solvents, especially in water and/or alcohol. Further, a large amount of organic waste is generated during the coating process, which is a heavy burden on the environment. Therefore, there has been a growing interest in hydrophilic POSS modification since it is environment friendly and does not use any low-volatile organic compounds (VOCs). Except for the introduction of the hydrophilicity, the novel modified POSS potentially provides the improved flexibility and/or other related function such as anti-smudge activity to the hard coating layer.

The following reference list sets forth the literatures mentioned in this section, which are incorporated herein by reference in their entirety:
1. CN1834180 A (published on 2006 Sep. 20) by Zhejiang University.
2. CN1752165 A (published on 2006 Mar. 29) by Chongzhao ZHANG.
3. Chansomwong, Kwanchan, et al. "Facile preparation of wear-resistant and anti-fingerprint hard coating with chemisorption of fluorosilane by simple wet coating." Journal of Sol-Gel Science and Technology (2020): 1-9.
4. CN 101024751 A (published on 2010 Apr. 21) by Xiamen University.
5. TW 1658099 B (published on 2019 May 1) by DAICEL.
6. Zhang, Kaka. *Transparent Omniphobic Coatings that are Flexible and Wear Resistant*. Diss. 2019.

SUMMARY OF THE INVENTION

To address the above-mentioned shortcomings, the present invention provides a series of organic-inorganic hybrid materials for preparing a bendable, transparent and photo/thermal curable coating film.

Accordingly, a first aspect of the present invention provides a thoroughly modified, functionalized polymeric hard coating material represented by one of the following formulae for a bendable, transparent and photo/thermal curable coating film:

  Formula (1);

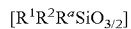  Formula (2), where $R^1$ comprises at least one hydrophobic epoxy or glycidyl-containing group, $R^2$ comprises at least one hydrophobic photo/thermal curable crosslinking group, $R^a$ comprises a substituent or an adduct derived from the $R^1$ or $R^2$ with a modifying reagent, and the substituent comprises at least one hydrophilic group or hydrophobic group, and the molar ratio of overall $R^1$ and $R^2$ groups to overall $R^a$ groups ranges from 1:79 to 79:1.

In accordance to one embodiment, the at least one hydrophobic photo/thermal curable crosslinking group is one or more selected from the group consisting of amine, oxetane, episulfide, acrylate, methacrylate, thiol-acrylate, thiol-methacrylate, acrylamide, vinyl sulfide, styrene, vinyl ether, norborneyl, cyclopentadiene and acryloxypropyl.

In accordance to one embodiment, the at least one hydrophobic epoxy or glycidyl-containing group is one or more selected from the group consisting of epoxy, epoxy cyclohexane, epoxypropoxy, cycloaliphatic epoxy, epoxidized olefins glycidyl and glycidyl ether.

In accordance to one embodiment, the at least one hydrophilic group is one or more selected from the group consisting of polyethylene glycol 1000 (PEG 1000), polyethylene glycol 2000 (PEG 2000), N-[tris(hydroxymethyl)methyl]-2-aminoethanesulfonic acid salt, diphenylamine-4-sulfonate salt, N-methyl sulfanilic acid salt, 3-(cyclohexylamino)-1-propanesulfonic acid and 2-aminoethanesulfonic acid.

In accordance to one embodiment, the modifying reagent is an organic chain structured compound structured as a linear or branched organic chain structure terminated with a reactive functional group at one terminal or pendant in structure.

In accordance to one embodiment, the reactive functional group comprises hydroxyl, thiol, amine, carboxyl, anhydride, or any combination thereof.

A second aspect of the present invention provides a method for synthesizing the thoroughly modified, functionalized polymeric hard coating material, the method comprising:

preparing polyhedral oligomeric silsesquioxane (POSS) represented by one of the formulae:

  Formula (3);

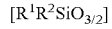  Formula (4), where $R^1$ comprises at least one hydrophobic epoxy or glycidyl-containing group, $R^2$ comprises at least one hydrophobic photo/thermal curable crosslinking group, and where the molar ratio of $R^1$ to $R^2$ ranges from 1:79 to 79:1, and the POSS represented by Formula (4) is synthesized by hydrolytic co-condensation between $R^1$ and $R^2$; and substituting the $R^1$ in the Formula (3) or $R^1$ and $R^2$ in the Formula (4) with $R^a$ to obtain the thoroughly modified, functionalized polymeric hard coating material represented by one of the formulae:

  Formula (1);

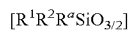  Formula (2), where $R^a$ comprises a substituent or an adduct derived from the $R^1$ or $R^2$ with a modifying reagent, and the substituent comprises at least one hydrophilic group or hydrophobic group, and the molar ratio of overall hydrophobic groups to overall hydrophilic groups ranges from 1:79 to 79:1.

A third aspect of the present invention provides a composition for forming a bendable, transparent and photo/thermal curable coating film, the composition comprising: 10 to 100 wt % of the thoroughly modified, functionalized polymeric hard coating material; one or more photo/thermal initiator components in a range of 0.2 to 5 wt %; at least one co-polymerizable reactive diluent in an amount of less than approximately 50 wt %, where the at least one co-polymerizable reactive diluent contains functional groups that co-polymerize with the thoroughly modified, functionalized polymeric hard coating material; and one or more additives. The composition is in liquid form before photo/thermal curing.

In accordance to one embodiment, the photo initiator component is one or more selected from the group consisting of aromatic phosphine oxides, diaromatic propanones, sulfonium salts, iodonium salts, selenium salts, ammonium salts, phosphonium salts and transition metal complexes, while the thermal initiator component is one or more selected from the group consisting of organic peroxides, Lewis acid halides, transition metal complexes and transition metal carbine complexes.

In accordance to one embodiment, the functional groups of the at least one co-polymerizable reactive diluent is one or more curable compounds selected from the group consisting of hydroxyl, thiol, amine, carboxyl, anhydride, epoxy, epoxy cyclohexane, epoxypropoxy, cycloaliphatic epoxy, epoxidized olefins, glycidyl ether, oxetane, episulfide, acrylate, methacrylate, thioacrylate, thiomethacrylate, acrylamide, vinyl sulfide, styrene, vinyl ether, styrene, norborneyl and cyclopentadiene.

In accordance to one embodiment, the one or more additives comprise two or more of a diluting solvent in a range of less than 90 wt %; a waterborne polymer emulsion in an amount less than 90 wt %; silica in a range of less than 90 wt %; a leveling agent in a range of greater less than 5 wt %; and an anti-microbial or anti-viral material in an amount less than 2 wt %.

In accordance to one embodiment, the diluting solvent comprises aromatic hydrocarbon, ether, acetone, ketone, ester, amide, nitrile, alcohol and water.

In accordance to one embodiment, the waterborne polymer emulsion comprises polyurethane emulsion and styrene-butyl-rubber emulsion.

In accordance to one embodiment, the anti-microbial or anti-viral material comprises silver, copper, zinc or titanium oxide nano-particles, pyridinium salts and 4,5-dichloro-2-octyl-3-isothiazolone.

A fourth aspect of the present invention provides a method for preparing a coating on a substrate from the said composition, where the method comprises synthesizing a thoroughly modified, functionalized polymeric hard coating material; mixing the thoroughly modified, functionalized polymeric hard coating material with one or more photo/thermal initiators, at least one co-polymerizable reactive diluent and one or more additives to obtain a liquid mixture; casting the liquid mixture to a substrate and drying the coated substrate in a drying oven at a temperature ranging from 25 to 120° C.; and photo-/thermally curing the coated substrate under either visible light, UV irradiation exposure or at an elevated temperature ranging from 25 to 200° C. to form the coating.

A fifth aspect of the present invention provides a bendable, transparent and photo/thermal curable coating film comprising a substrate and a hard coating layer deposited upon at least one side of the substrate. The hard coating layer is formed through polymerization of said composition, where the content of the composition is in a range from 10 wt % to less than 100 wt %, and the hard coating film has a pencil hardness of at least 6H on a flexible substrate, a pencil hardness of at least 9H on a rigid substrate, a light transparency of at least 85% and an antimicrobial effectiveness of at least 99%.

In accordance to one embodiment, the hard coating film has a flexibility and durability for folding to a bending radius of 2 mm over more than 100000 cycles without permanent deformation or fracture.

In accordance to one embodiment, the substrate is a flexible substrate comprising colorless polyimide (CPI), polyimide (PI), polyethylene terephthalate (PET), polyamide (PA), thermoplastic polyurethane (TPU) and ultra thin glass (UTG).

In accordance to one embodiment, the substrate is a rigid substrate comprising poly(methyl methacrylate) (PMMA), polypropylene (PP), polycarbonate (PC), metal, glass, wood and marble.

In accordance to one embodiment, the hard coating film has a thickness in a range of 1 to 100 μm.

The present invention provides a novel organic-inorganic hybrid material for hard coating. The modification of functionalized POSS is achieved by partially quenching the photo/thermal curable functional group(s) with one or more modifying reagents. Regarding the structure of the organic-inorganic hybrid material, the inorganic parts provide hardness to improve wear resistance of the substrate surface, while the organic parts form the crosslinking structure and provides flexibility, which are potentially used in a hard coating film on a substrate. The modification will also introduce or enhance desired properties of resulting thoroughly modified, functionalized POSS for a hard coating composition, such as water solubility, hydrophilicity, hydrophobicity and anti-fingerprint.

The prepared bendable, transparent and photo/thermal curable coating film exhibits higher surface hardness, higher transparency and a certain degree of flexibility. For example, the thoroughly modified, functionalized POSS-containing coating film has a pencil hardness of at least 6H on a flexible substrate, a pencil hardness of at least 9H on a rigid substrate, a light transparency of at least 85% and an antimicrobial effectiveness of at least 99%. In addition, the coating film has a flexibility and durability for folding to a bending radius of 2 mm over more than 100000 cycles without permanent deformation or fracture.

BRIEF DESCRIPTION OF THE DRAWINGS

The present invention will be more readily understood from the following description of the embodiments thereof given, by way of example only, with reference to the accompying drawings, in which:

FIG. 3 depicts a schematic diagram of the overall process of synthesizing a thoroughly modified, functionalized polymeric hard coating material.

DETAILED DESCRIPTION

The present invention will be described in detail through the following embodiments with appending drawings. It should be understood that the specific embodiments are provided for an illustrative purpose only, and should not be interpreted in a limiting manner. Those skilled in the art will appreciate that the invention described herein is susceptible to variations and modifications other than those specifically described.

The invention includes all such variation and modifications. The invention also includes all of the steps and features referred to or indicated in the specification, individually or collectively, and any and all combinations or any two or more of the steps or features. Other aspects and advantages of the invention will be apparent to those skilled in the art from a review of the ensuing description.

In order to prepare a bendable, transparent and photo/thermal curable coating film, the present invention provides a novel class of thoroughly modified, functionalized polymeric hard coating materials, namly thoroughly modified, functionalized polyhedral oligomeric silsesquioxane (POSS), which are well synthesized by introducing hydrophilic groups into hydrophobic POSS. The thoroughly modified, functionalized POSS can be uniformly dissolved in various hydrophilic solvents, such as water and ethanol.

In one embodiment, the thoroughly modified, functionalized POSS includes one of the following formulae:

$[R^1R^aSiO_{3/2}]$  Formula (1);

$[R^1R^2R^aSiO_{3/2}]$  Formula (2), where $R^1$ includes at least one hydrophobic epoxy or glycidyl-containing group, $R^2$ includes at least one hydrophobic photo/thermal curable crosslinking group, $R^a$ includes a substituent or an adduct derivatized from the $R^1$ or $R^2$ with a modifying reagent, and the substituent comprises at least one hydrophilic group or hydrophobic group. The molar ratio of overall hydrophobic groups to overall hydrophilic groups ranges from 1:79 to 79:1.

Figure 1:
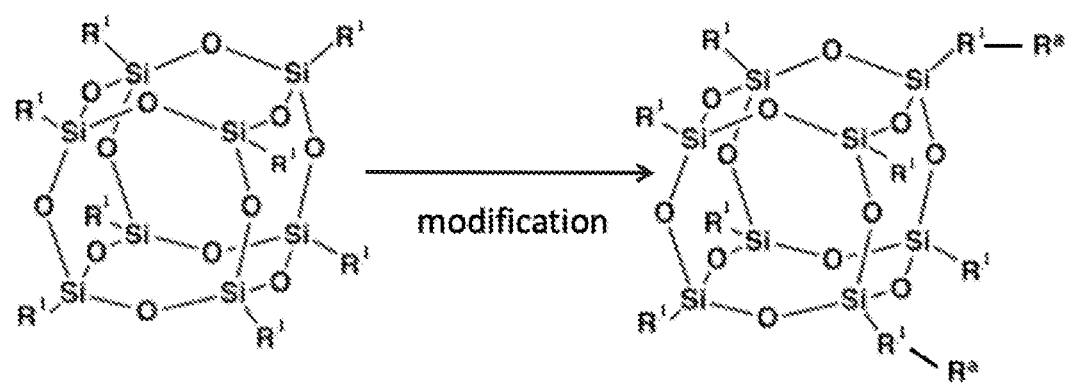
FIG. 1 depicts a schematic view of a thoroughly modified, functionalized polymeric hard coating material in accordance with one embodiment of the present invention.
Figure 2:
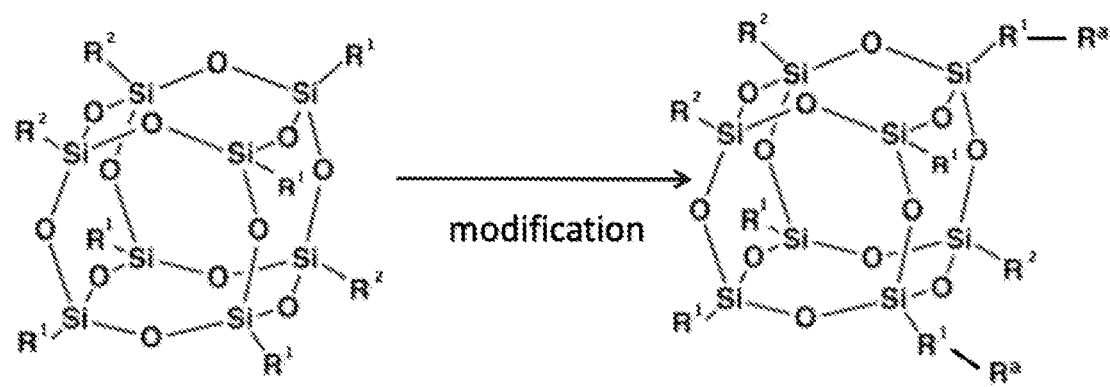
FIG. 2 depicts a schematic view of a thoroughly modified, functionalized polymeric hard coating material in accordance with another embodiment of the present invention.

In one embodiment, FIG. 1 shows a thoroughly modified, functionalized POSS with Formula (1), which presents a cage structure. FIG. 2 shows a thoroughly modified, functionalized POSS with Formula (2), which presents a cage structure. In this disclosure, the structure of the thoroughly modified, functionalized POSS can be cage, half-cage, ladder structures, or any combination thereof.

In another embodiment, the at least one hydrophobic epoxy or glycidyl-containing group of $R^1$ may be selected from, but not limited to epoxy, epoxy cyclohexane, epoxypropoxy, cycloaliphatic epoxy, epoxidized olefins glycidyl and glycidyl ether.

In yet another embodiment, the at least one hydrophobic photo/thermal curable crosslinking group of $R^2$ may be selected from, but not limited to amine, oxetane, episulfide, acrylate, methacrylate, thioacrylate, thiomethacrylate, acrylamide, vinyl sulfide, styrene, vinyl ether, styrene, norborneyl, cyclopentadiene and acryloxypropyl.

In other embodiment, the at least one hydrophilic group of $R^a$ may be selected from, but not limited to polyethylene glycol 1000 (PEG 1000), polyethylene glycol 2000 (PEG 2000), N-[tris(hydroxymethyl)methyl]-2-aminoethanesulfonic acid salt, diphenylamine-4-sulfonate salt, N-methyl sulfanilic acid salt, 3-(cyclohexylamino)-1-propanesulfonic acid and 2-aminoethanesulfonic acid.

A method for synthesizing the thoroughly modified, functionalized polymeric hard coating material is also provided in this disclosure, as shown in FIG. 3. In particular, the thoroughly modified, functionalized POSS are derived from hydrophobic POSS including mono-functional hydrophobic POSS or multi-functional hydrophobic POSS.

Referring to FIG. 3, in Step 101, one or more hydrophobic POSS are prepared. These hydrophobic POSS contain sulfonate or polyethylene glycol (PEG) groups and have ratios of specific structures controlled within a specific range (e.g. a ratio of sulfonate/PEG unit to epoxy-containing unit). The number average molecular weight and the molecular weight dispersity therein are also controlled within a specific range.

In one embodiment, the mono-functional hydrophobic POSS are derived from a corresponding trifunctional hydrolyzable silane compound through hydrolysis and condensation reaction. The mono-functional hydrophobic POSS includes the following formulae:

[$R^1SiO_{3/2}$],                                                              Formula (3);

$R^1$ represents at least one hydrophobic epoxy or glycidyl-containing group, such as epoxy, epoxy cyclohexane, epoxypropoxy, cycloaliphatic epoxy, epoxidized olefins glycidyl and glycidyl ether. The structure of POSS with Formula (3) can be cage, half-cage, ladder structures, or any combination thereof.

In another embodiment, the hydrophobic POSS may further include one or more multi-functional crosslinking groups. The multi-functional hydrophobic POSS are synthesized via hydrolytic co-condensation of two functionalized trifunctional silane compounds. The multi-functional hydrophobic POSS includes the following formulae:

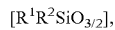
[$R^1R^2SiO_{3/2}$],                                                              Formula (4);

$R^1$ represents at least one hydrophobic epoxy or glycidyl-containing group, such as epoxy, epoxy cyclohexane, epoxypropoxy, cycloaliphatic epoxy, epoxidized olefins glycidyl and glycidyl ether; while $R^2$ represents at least one hydrophobic photo/thermal curable crosslinking group or other functional groups. The at least one hydrophobic photo/thermal curable crosslinking group such as oxetane, episulfide, acrylate, methacrylate, thioacrylate, thiomethacrylate, acrylamide, vinyl sulfide, styrene, vinyl ether, styrene, norborneyl, cyclopentadiene and acryloxypropyl, and the other functional groups can be selected from, but not limited to fluorocarbon, thiol and amine. The molar ratio of $R^1$ to $R^2$ ranges from 1:79 to 79:1. The structure of POSS with Formula (4) can be cage, half-cage, ladder structures, or any combination thereof.

In Step 102, the 10 in the Formula (3) or 10 and $R^2$ in the Formula (4) are substituted with $R^a$ to obtain a thoroughly modified, functionalized POSS represented by Formula (1) and/or Formula (2). $R^a$ includes a substituent or an adduct derived from the 10 or $R^2$ with a modifying reagent, and the substituent comprises at least one hydrophilic group or hydrophobic group. The molar ratio of $R^a$ to 10 ranges from 1:79 to 79:1, and the molar ratio of $R^a$ to $R^1+R^2$ ranges from 1:79 to 79:1.

In this disclosure, the thoroughly modified, functionalized POSS are introduced with at least one optimizing chain. Introducing the at least one optimizing chain onto the POSS can be achieved by partially quenching functionalized silsesquioxanes with at least one modifying reagent. The modifying reagent is an organic chain-structured compound, which is structured as a linear or branched organic chain structure terminated with a reactive functional group at one terminal or pendant in structure.

In one embodiment, the reactive functional group of the modifying reagent includes hydroxyl, thiol, amine, carboxyl, anhydride, or a combination thereof.

Further, the thoroughly modified, functionalized polymeric hard coating material can be further applied to a hard coating composition, which can be used in forming a bendable, transparent and photo/thermal curable coating, exhibiting improved abrasion-resistance on the surface of substrate. The hard coating composition of the present invention includes organic backbones and two or more photo/thermal curable functional groups either attached on terminals or on pendants of the organic backbones. Preferably, the organic backbones of the co-polymerizable reactive diluent can be aliphatic, cycloaliphatic, oligo- or poly-ether and aromatic in structure, possessing at least two terminals or pendants functionalized by one type of aforementioned functional group.

The components of the curable composition includes a mixture, blend and/or the reaction products of 10 to 100 wt % of the thoroughly modified functionalized polymeric hard coating material; photo/thermal initiator components in a range of 0.2 to 5 wt %; and at least one co-polymerizable reactive diluent in an amount of less than approximately 50 wt %. The prepared composition is in liquid form before photo/thermal curing.

In one embodiment, the at least one co-polymerizable reactive diluent contains functional groups that can co-polymerize with the thoroughly modified, functionalized polymeric hard coating material. This allows the adjustment of viscosity of the hard coating composition, more efficient crosslinking and the change of the resulting coating properties. The co-polymerizable reactive diluent refers to curable compounds, except for the POSS disclosed in the present invention. The choice of the co-polymerizable reactive diluent depends on the polymerization mechanism of which the thoroughly modified, functionalized POSS can go through. For example, the functional groups of the co-polymerizable reactive diluent may be selected from, but not limited to hydroxyl, thiol, amine, carboxyl, anhydride, epoxy, epoxy cyclohexane, epoxypropoxy, cycloaliphatic epoxy, epoxidized olefins, glycidyl ether, oxetane, episulfide, acrylate, methacrylate, thioacrylate, thiomethacrylate, acrylamide, vinyl sulfide, styrene, vinyl ether, styrene, norborneyl and cyclopentadiene.

In another embodiment, photo/thermal initiators are compounds that initiate and/or promote a cationic polymerization reaction of cationically curable compounds (e.g. POSS according to the present invention). The photo/thermal initiator components show none or substantially none catalytic behavior in the curable composition under non-stimulated condition, namely, without exposing to visible light, UV light or in elevated temperatures. The choice of initiator components depends on which polymerization mechanism the thoroughly modified, functionalized POSS can go through. Preferably, the photo initiator component is selected from the following compounds and/or mixtures and/or combinations in purified and/or diluted form of aromatic phosphine oxides, diaromatic propanones, sulfonium salts, iodonium salts, selenium salts, ammonium salts, phosphonium salts and transition metal complexes, while the thermal initiator component is selected from one or more of organic peroxides such as peroxy acid, persulfate, alkyl carbonate peroxide and aromatic carbonate peroxide; Lewis acid halides such as alkylaluminum halides; transition metal complexes such as titanium-, tungsten-, vanadium-, molybdenum-, palladium-complexes; and transition metal carbine complexes. Both the thermal initiator and the photo initiator components can be used solely, or in combinations.

For thermal curing, the curable composition further contains one or more epoxy curing agent including, but not limited to amines, acid anhydrides, imidazole, phenol-formaldehyde and amino-formaldehyde resins.

In certain application of this invention, the curable composition may further contain one or more additives. The selection and contents of the additives largely depend on the specific industrial application. The additives include two or more of: a diluting solvent in a range of less than 90 wt % based on the total amount of the curable composition; a waterborne polymer emulsion in an amount less than 90 wt %; silica for matte coating modification in a range of less than 90 wt %; a leveling agent for surface control in a range of greater less than 5 wt %; and an anti-microbial or anti-viral material in an amount less than 2 wt %.

In one embodiment, the diluting solvent is added to adjust the applicability of the composition for different application scenarios. The diluting solvent can be aromatic hydrocarbon such as benzene, toluene, xylenes and ethylbenzene; ether such as diethyl ether, dimethoxyethane, tetrahydrofuran, and dioxane; ketone such as acetone, methyl ethyl ketone, and methyl isobutyl ketone; ester such as methyl acetate, ethyl acetate, isopropyl acetate, and butyl acetate; amide such as N,N-dimethylformamide and N,N-dimethylacetamide; nitrile such as acetonitrile, propionitrile, and benzonitrile; alcohol such as methanol, ethanol, isopropyl alcohol, and butanol; and water. Among them, the solvent for hydrophobic POSS is preferably selected from ketone and ether, and the solvent for thoroughly modified, functionalized POSS is preferably selected form water and ethanol. All of these solvents can be used solely or in combination.

In another embodiment, the waterborne polymer includes emulsion polyurethane emulsion and styrene-butyl-rubber emulsion.

In yet another embodiment, the anti-microbial or anti-viral material includes silver, copper, zinc or titanium oxide nano-particles, pyridinium salts and 4,5-dichloro-2-octyl-3-isothiazolone.

The synthesized composition with thoroughly modified, functionalized POSS having adjustable and crosslinkable content and hydrophilic/hydrophobic balance, excellent compatibility and dispersibility, and sufficient physical and mechanical properties.

The curing technique may be any well-known techniques without limitation. For instance, the composition is either photo curable under visible light, UV irradiation exposure, or thermally curable. For UV curing, the curable composition is preferably irradiated typically at about 1 to about 1000 mJ/cm$^2$. For thermal curing, the heating conditions in this invention are not limited, but the thermal curing is performed typically preferably at an elevated temperature ranging from 25–200° C.

After curing, the composition is used as an anti-scratch protecting coating layer on various substrates, which exhibits higher surface hardness, higher transparency and a certain degree of flexibility. The cured composition has preferably a high surface hardness equal to or higher than 6H on flexible substrates, a surface harness of at least 9H on rigid substrates, higher transparency of at least 90%, and anti-scratch ability. Further, the cured composition has excellent flexibility and durability for folding to a bending radius of 2 mm over more than 100000 cycles without permanent deformation or fracture.

In one embodiment, the composition not only exhibits compatibility on various flexible substrates such as colorless polyimide (CPI), polyimide (PI), polyethylene terephthalate (PET), polyamide (PA) and thermoplastic polyurethane (TPU), but also exhibits compatibility on rigid substrates such as poly(methyl methacrylate) (PMMA), polypropylene (PP), polycarbonate (PC), metal, glass, wood and marble.

Figure 4:
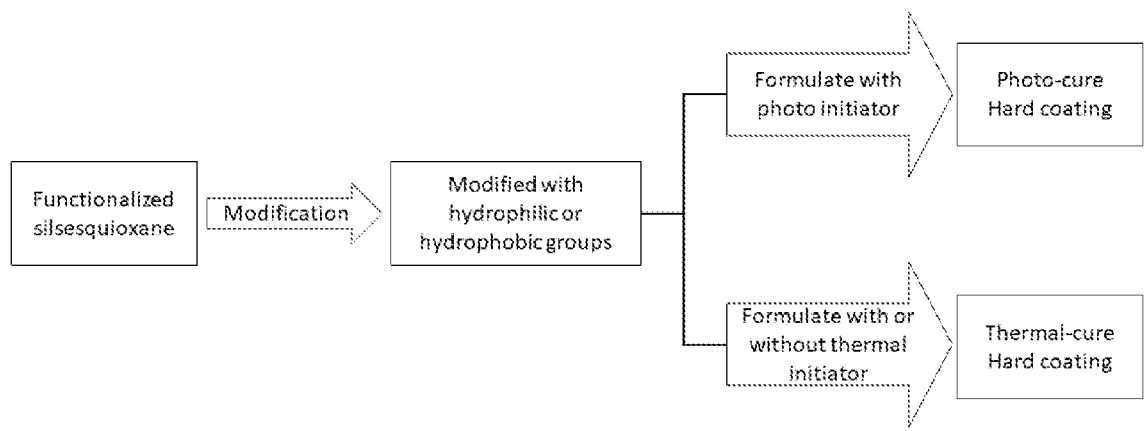
FIG. 4 depicts a schematic diagram of the overall process of preparing a thoroughly modified, functionalized POSS-containing composition in accordance to one embodiment of the present invention.

According to the present invention, there is also provided a series of synthetic methods for preparing the aforementioned curable composition on a substrate with higher surface hardness equal to or higher than 6H and higher light transparency equal to or higher than 85%. FIG. 4 shows a schematic diagram of the overall process of preparing a thoroughly modified, functionalized POSS-containing composition, the preparation methods include:

(1) Synthesizing said thoroughly modified, functionalized polymeric hard coating material through the derivatization of the photo/thermal curable functional groups of the functionalized POSS with a modifying reagent. The functionalized POSS, modifying reagent and suitable solvents are mixed, and the mixture is stirred at a suitable temperature for about 2-8 hours. More particularly, the thoroughly modified, functionalized polymeric hard coating material is formed via the reaction between photo/thermal curable, functionalized POSS and a modifying reagent by partially quenching the photo/thermal curable functional groups, a modified substituent or adduct on the functionalized POSS.

(2) Mixing the thoroughly modified, functionalized polymeric hard coating material with one or more photo/thermal initiators, at least one co-polymerizable reactive diluent and one or more additives to obtain a liquid mixture.

(3) Casting the liquid mixture to a substrate and drying the coated substrate in a drying oven at a temperature ranging from 25 to 120° C. to eliminate undesirable diluting solvents. The application of the curable composition involves certain coating techniques including, but not limited to blade coating, spin coating, dip coating, brush painting and spray coating. The liquid mixture is casted onto flexible/rigid plain substrates with doctor blade technique, spin coating technique, dip coating technique, or spray coating technique. In addition, the liquid mixture is casted onto flexible/rigid irregular substrates with dip coating technique, brush painting technique, or spray coating technique.

(4) Photo/thermally curing the coated substrate under either visible light, UV irradiation exposure or at elevated temperature ranging from 25 to 200° C. to form the curable composition.

The prepared composition exhibits a higher surface hardness over 6H on flexible substrates such as PI, PET, PA, and exhibits a higher surface hardness of 9H on rigid substrates such as PMMA, PP, metal, wood or marble.

Recently, there has been a growing interest in a waterborne coating because it is environment friendly and does not use any low-volatile organic compounds (VOCs). An application of the curable composition according to the present invention is to provide a coating film, which includes a substrate and a hard coating layer. The hard coating layer is formed through the polymerization process of curable composition according to the present invention. By using said thoroughly modified, functionalized POSS, the coating layer can be coated onto the organic solvent-intolerant substrates (e.g., PC), and therefore the preparation method can be simplified and a transparent, abrasion-resistant, bendable hard coating layer on a substrate surface can be obtained accordingly. Moreover, this kind of waterborne coating film is environmental friendly and does not use any low-volatile organic compounds.

The photo/thermal curable composition of the present invention can be used as a protective coating layer for various substrates where anti-scratch property is required, in which the curable composition may be in a content range which is not limited to, but preferably from 10% to less than 100% by weight. For instance, the hard coating composition of the present invention can be used as a protective coating layer for a rigid substrate surface, such as furniture wood, plastic materials for toys, door handles of cars, mobile phone casings, laptop casings, watch glasses, traditional mobile phone display glasses, display device plastic materials, office building entrance cards, banking cards, identity cards, prescription glasses, camera lenses, etc. Preferably, the hard coating composition of the present invention can also be used to form a protective coating layer for a flexible substrate, such as curved display plastic materials, rollable display plastic materials, foldable display plastic materials, mobile phone screen protecting membranes, etc.

The prepared hard coating film has a thickness in a range of 1 to 100 μm, higher light transparency of at least 85% and a pencil hardness of at least HB, and exhibits excellent flexibility and durability for folding to a bending radius of 2 mm over more than 100000 cycles without permanent deformation or fracture.

The following examples illustrate the present invention and are not intended to limit the same.

EXAMPLE

Preparation of Epoxy-Containing POSS

Example 1

40 g of 3-(2,3-epoxypropoxy)propyltrimethoxysilane (EMS) was mixed with 50-200 g of acetone in a reactor. Then, the mixture was reacted at 30-70° C. for 10 minutes, and 3-10 g of 5% aqueous solution of potassium carbonate was added dropwise to the reaction mixture. After 30-120 minutes, 50 g of water was added dropwise to the reaction mixture, and the reaction conditions were kept at 30-70° C. for 3-12 hours.

After completion of the hydrolysis and condensation reactions, the product in the reaction mixture was cooled and washed with water, and extracted with ethyl acetate. The upper layer was collected and dried with magnesium sulfate. Finally, the solvent in dried organic solution was distilled off at 60° C. This yielded an epoxy-containing POSS, which was a transparent liquid product.

Preparation of Epoxy and Acrylate-Containing POSS

Example 2

40 g of 3-(acryloyloxy)propyltrimethoxysilane (AMS) and 10 g of 3-(2,3-epoxypropoxy)propyltrimethoxysilane (EMS) was mixed with 50-200 g of acetone in a reactor. Then, the mixture was reacted at 30-70° C. for 10 minutes, and 3-10 g of 5% aqueous solution of potassium carbonate was added dropwise to the reaction mixture. After 20 minutes, 50 g of water was added dropwise to the reaction mixture, and the reaction conditions were kept at 30-70° C. for 3-12 hours.

After completion of the hydrolysis and condensation reactions, the product in the reaction mixture was cooled and washed with water, and extracted with ethyl acetate. The upper layer was collected and dried with magnesium sulfate. Finally, the solvent in dried organic solution was distilled off at 60° C. This yielded an epoxy and acrylate-containing POSS, which was a transparent liquid product. The structure of this multifunctional POSS can be tuned by changing the ratio of 3-(acryloyloxy)propyltrimethoxysilane to 3-(2,3-Epoxypropoxy)propyltrimethoxysilane.

Preparation of Hydrophilic Epoxy-Containing POSS or Hydrophilic Epoxy and Acrylate-Containing POSS Example 3

10 g of epoxy-containing POSS prepared in Example 1, 3.5 g of JEFFAMINE®-M1000 and 20 g of methanol were placed in a 50 mL reactor, followed by increasing the temperature to 60° C. The reaction conditions was kept at 60° C. for 5 hours. This yielded a hydrophilic epoxy-containing POSS, which was a non-transparent, liquid product.

Examples 4-10

Various hydrophilic epoxy-containing POSS or hydrophilic epoxy and acrylate-containing POSS were prepared by a procedure similar to that shown in Example 3, except for changing the amount of starting materials including POSS and hydrophilic amine. The type and amount of the solvent, the reaction temperature, and the reaction time were shown in Table 1. In Table 1, JEFFAMINE-M1000® is a hydrophilic polyether monoamine, and JEFFAMINE-M2000® is a hydrophilic polyether monoamine. S1 is referred to the epoxy-containing POSS prepared in Example 1, and S2 is referred to the epoxy and acrylate-containing POSS prepared in Example 2.

TABLE 1

|  | Example 1 | Example 2 | Example 3 | Example 4 | Example 5 |
|---|---|---|---|---|---|
| Silsesquioxane | EMS | EMS | AMS | — | — | — |
| Silsesquioxane amount (g) | 40 | 10 | 40 | — | — | — |
| POSS | — | — | — | S1 | S1 | S1 |
| POSS amount (g) | — | — | — |  |  |  |
| Hydrophilic amine | — | — | — | PEG_1000 | PEG_2000 | diphenylamine-4-sulfonate salt |

TABLE 1-continued

| | | | | | |
|---|---|---|---|---|---|
| Hydrophilic amine amount (g) | — | — | 3.5 | 3.5 | 1 |
| Solvent | acetone | acetone | methanol | methanol | methanol |
| Solvent amount (g) | 50~200 | 50~200 | 20 | 20 | 20 |
| 5% K$_2$CO$_3$ aq (g) | 3~10 | 3~10 | — | — | — |
| H$_2$O (g) | 50 | 50 | — | — | — |
| Reaction temperature (° C.) | 30~70 | 30~70 | 60 | 60 | 60 |
| Reaction time (hr) | 3~12 | 3~12 | 5 | 5 | 5 |
| Sample name | S1 | S2 | S3 | S4 | S5 |

| | Example 6 | Example 7 | Example 8 | Example 9 | Example 10 |
|---|---|---|---|---|---|
| Silsesquioxane | — | — | — | — | — |
| Silsesquioxane amount (g) | — | — | — | — | — |
| POSS | S1 | S2 | S2 | S2 | S2 |
| POSS amount (g) | — | — | | | |
| Hydrophilic amine | 3-(Cyclohexyl amino)-1-propanesulfonic acid | PEG_1000 | PEG_2000 | diphenylamine-4-sulfonate salt | diphenylamine-4-sulfonate salt |
| Hydrophilic amine amount (g) | 1 | 3.5 | 3.5 | 1 | 1 |
| Solvent | methanol | methanol | methanol | methanol | methanol |
| Solvent amount (g) | 20 | 20 | 20 | 20 | 20 |
| 5% K$_2$CO$_3$ aq (g) | — | — | — | — | — |
| H$_2$O (g) | — | — | — | — | — |
| Reaction temperature (° C.) | 60 | 60 | 60 | 60 | 60 |
| Reaction time (hr) | 5 | 5 | 5 | 5 | 5 |
| Sample name | S6 | S7 | S8 | S9 | S10 |

In addition, Table 2 listed the hydrophobic functional groups of $R^1$ and $R^2$ and the hydrophobic and/or hydrophilic groups of $R^a$ used in each of Examples 1-10. The molar ratios between $R^1$ to $R^2$, $R^1$ to $R^a$, or $R^1+R^2$ to $R^a$ are also provided.

TABLE 2

| Examples | $R^1$ | $R^2$ | $R^a$ | Mole ratio |
|---|---|---|---|---|
| Example 1 | glycidyl | — | — | — |
| Example 2 | glycidyl | acrylopropyl | — | ratio between $R^1$ to $R^2$ ranged from 1:79 to 79:1 |
| Example 3 | glycidyl | — | PEG_1000 | ratio between $R^1$ to $R^a$ ranged from 1:79 to 79:1 |
| Example 4 | glycidyl | — | PEG_2000 | ratio between $R^1$ to $R^a$ ranged from 1:79 to 79:1 |
| Example 5 | glycidyl | — | diphenylamine-4-sulfonate salt | ratio between $R^1$ to $R^a$ ranged from 1:79 to 79:1 |
| Example 6 | glycidyl | — | 3-(Cyclohexylamino)-1-propanesulfonic acid | ratio between $R^1$ to $R^a$ ranged from 1:79 to 79:1 |
| Example 7 | glycidyl | acrylopropyl | PEG_1000 | ratio between $R^1 + R^2$ to $R^a$ ranged from 1:79 to 79:1 |
| Example 8 | glycidyl | acrylopropyl | PEG_2000 | ratio between $R^1 + R^2$ to $R^a$ ranged from 1:79 to 79:1 |
| Example 9 | glycidyl | acrylopropyl | diphenylamine-4-sulfonate salt | ratio between $R^1 + R^2$ to $R^a$ ranged from 1:79 to 79:1 |
| Example 10 | glycidyl | acrylopropyl | 3-(Cyclohexylamino)-1-propanesulfonic acid | ratio between $R^1 + R^2$ to $R^a$ ranged from 1:79 to 79:1 |

Preparation of Hard Coating Films

Example 11

A hard coating solution was prepared by blending 50% by weight of epoxy and acrylate-containing POSS synthesized in Example 2, 50% by weight of acetone and 8% by weight of diethylenetriamine. The prepared hard coating solution was applied onto a PI film.

The PI film coated with epoxy and acrylate-containing POSS was put into an oven at 110° C. for 3 hours. This yielded a hard coating film with the hard coating layer.

Example 12

Various hard coating solutions were prepared by a procedure similar to that shown in Example 11, except for changing the formulation of the hard coating composition, substrate, thickness and curing program as given in Table 3. In Table 3, GARICURE® PI 6976 is bis[4-(diphenylsulfonio)phenyl] sulfide bis(hexafluoroantimonate), which is a photo-initiator; TPO is a free-radical initiator; and DOUBLECURE® 184 is 1-Hydroxycyclohexyl phenyl ketone, which is another free-radical initiator. S1 is referred to the epoxy-containing POSS prepared in Example 1, and S2 is referred to the epoxy and acrylate-containing POSS prepared in Example 2.

The prepared hard coating film was examined and assessed via the following methods:

1. Pencil Hardness Testing:
   The Pencil hardness of a hard coating layer of the prepared hard coating film was assessed in conformity to JIS K 5600-5-4 and ISO 15184-980.
2. Scratch resistance testing:
   Abrasion Resistance Tester (ZL-1073 supplied by Dongguan Zhongli Instrument Technology) and steel wool #0000 were used for abrasion tests. The hard coating layer of the prepared hard coating film was rubbed by reciprocating movements under a load of 1 kg/cm$^2$.

As shown in Table 3, the hard coating layer prepared in Example 11 having a pencil hardness of 4H, and can withstand 100 times of rubs under a load of 1 kg/cm$^2$. The hard coating layer prepared in Example 12 having a pencil hardness of 5H, and can withstand 100 times of rubs under a load of 1 kg/cm$^2$.

Preparation of a Hydrophilic and Photo/Thermal Curable Hard Coating Composition

Example 13

A hydrophilic and photo/thermal curable hard coating composition was prepared by blending 50% by weight of hydrophilic epoxy-containing POSS synthesized in Example 3, 50% by weight of ethanol and 4% by weight of diethylenetriamine.

The above hydrophilic and photo/thermal curable coating composition was applied onto a PC substrate. The PC substrate coated with hydrophilic and curable coating composition was put into an oven at 110° C. for 3 hours.

Examples 14-20

Various hydrophilic and photo/thermal curable hard coating compositions were prepared by a procedure similar to that shown in Example 13, except for changing the formulation of the hard-coating composition and curing program as given in Table 4. The sample names of POSS refer to the sample names given in Table 1. In Table 4, GARICURE® PI 6976 is bis[4-(diphenylsulfonio)phenyl]sulfide bis(hexafluoroantimonate), which is a photo-initiator; OPI is another photo-initiator; TPO is a free-radical initiator; and DOUBLECURE® 184 is 1-Hydroxycyclohexyl phenyl ketone, which is another free-radical initiator.

TABLE 3

|  |  | Example 11 | Example 12 |
|---|---|---|---|
| POSS | S1 | — | — |
|  | S2 | 50% | 50% |
| Solvent | acetone | 50% | 50% |
| Initiator | GARICURE® PI 6976 | — | 1 wt % POSS |
|  | diethylenetriamine | 8 wt % POSS | — |
|  | TPO | — | 2 wt % POSS |
|  | DOUBLECURE® 184 | — | 1 wt % POSS |
| Curing program | ultraviolet curing | — | 157 mw/cm$^2$, 2 min |
|  | thermal curing | 110° C., 3 hours | — |
| Substrate |  | PI | PET |
| Thickness |  | 15 μm | 30 μm |
| Pencil hardness |  | 4H | 5H |
| Scratch resistance (1 kg/cm$^2$) |  | 100 times pass | 100 times pass |

TABLE 4

|  |  | Example 13 | Example 14 | Example 15 | Example 16 |
|---|---|---|---|---|---|
| POSS | S3 | 50% | — | — | — |
|  | S4 | — | 50% | — | — |
|  | S5 | — | — | 50% | — |
|  | S6 | — | — | — | 50% |
|  | S7 | — | — | — | — |
|  | S8 | — | — | — | — |
|  | S9 | — | — | — | — |
|  | S10 | — | — | — | — |
| Solvent | ethanol | 50% | — | — | 50% |
|  | water | — | 50% | 50% | — |
| Initiator | GARICURE® PI 6976 | — | — | 2 wt % POSS | 2 wt % POSS |
|  | OPI | — | 2 wt % POSS | — | — |
|  | diethylenetriamine | 8 wt % POSS | — | — | — |
|  | TPO | — | — | — | — |
|  | DOUBLECURE® 184 | — | — | — | — |

TABLE 4-continued

| | | | | | |
|---|---|---|---|---|---|
| Curing program | ultraviolet curing | — | — | 157 mw/cm², 2 min | 157 mw/cm², 2 min |
| | thermal curing | 110° C., 3 hour | 110° C., 1 hour | — | — |
| Substrate | | PET | PET | PI | PI |
| Thickness | | 30 μm | 15 μm | 40 μm | 30 μm |
| Pencil hardness | | 2H | H | 3H | 2H |
| Scratch resistance (1 kg/cm²) | | 50 times pass | 30 times pass | 50 times pass | 30 times pass |

| | | Example 17 | Example 18 | Example 19 | Example 20 |
|---|---|---|---|---|---|
| POSS | S3 | — | — | — | — |
| | S4 | — | — | — | — |
| | S5 | — | — | — | — |
| | S6 | — | — | — | — |
| | S7 | 50% | — | — | — |
| | S8 | — | 50% | — | — |
| | S9 | — | — | 50% | — |
| | S10 | — | — | — | 50% |
| Solvent | ethanol | 50% | — | — | 50% |
| | water | — | 50% | 50% | — |
| Initiator | GARICURE ® PI 6976 | — | — | — | — |
| | OPI | | | | |
| | diethylenetriamine | — | — | — | — |
| | TPO | 4 wt % POSS | 4 wt % POSS | 4 wt % POSS | 4 wt % POSS |
| | DOUBLECURE ® 184 | 2 wt % POSS | 2 wt % POSS | 2 wt % POSS | 2 wt % POSS |
| Curing program | ultraviolet curing | 157 mw/cm², 2 min | 157 mw/cm², 2 min | 157 mw/cm², 2 min | 157 mw/cm², 2 min |
| | thermal curing | — | — | — | — |
| Substrate | | PC | PC | PC | PC |
| Thickness | | 20 μm | 30 μm | 20 μm | 30 μm |
| Pencil hardness | | H | 2H | H | 2H |
| Scratch resistance (1 kg/cm²) | | 30 times pass | 30 times pass | 30 times pass | 30 times pass |

As shown in Table 4, the prepared hard coating film prepared in Examples 13-20 having a pencil hardness of 1H-3H, and can withstand 30-50 times of rubs under a load of 1 kg/cm².

Example 21

20 g of epoxy-containing POSS prepared in Example 1, 3 g of monoaminopropyl terminated poly(dimethyl siloxane) (NH2-PDMS) and 20-50 mL toluene were placed in a 250 mL reactor, followed by increasing the temperature to 60-120° C. for 4 hours.

The resulting product was extracted with acetonitrile. The supernatant layer was collected and the solvent was distilled off at 50° C. This yield a PDMS and epoxy-containing POSS, which is a transparent, liquid product.

Preparation of Anti-Smudge Hard Coating Compositions

Example 22

An anti-smudge hard coating composition was prepared by blending 50% by weight of epoxy-containing POSS synthesized in Example 1, 50% by weight of PDMS and epoxy-containing POSS synthesized in Example 21 and 8% by weight of diethylenetriamine.

The prepared anti-smudge hard coating composition was applied onto a TPU film. The TPU film coated with anti-smudge hard coating composition was put into an oven at 110° C. for 3 hours. This yielded a hard coating film with the anti-smudge hard coating layer.

Example 23

The hard coating film prepared in Example 22 was examined and assessed on various methods given in Table 3, except test methods for contact angle, sliding angle of water and contact angle hysteresis. The methods for analyzing the sample properties, including contact angles, sliding angles, contact angle hysteresis and bending flexibility were shown as follows. Results are presented in Table 5. The sample names of POSS refer to the sample names given in Table1.
1. Drop shape analyzer (DSA25 supplied by KRÜSS GmbH) was used for anti-smudge property assessment. To measure the static contact angles (CAs), 10-uL droplet was applied to a fixed coated film obtained from Example 2 at room temperature of 25° C. The sliding angles (SAs) were measured using 20 μL of water and the rising rate of the tilting angle was 0.5°/s (from 0°).
2. Tension free U shape Folding Test Machine (supplied by Gredmann Taiwan Ltd.) was employed for film bending test. Radius of 2 mm and 6 mm was applied for in-fold and out-fold bending respectively.

TABLE 5

| | | Example 22 |
|---|---|---|
| POSS | S1 | 50% |
| | Example 21 | 50% |
| Initiator | diethylenetriamine | 8 wt % POSS |
| Curing program | thermal curing | 110° C., 3 hours |
| Substrate | | TPU |
| Thickness | | 30 μm |
| Scratch resistance (1 kg/cm²) | | 20 times pass |
| Contact angle | | 100° |

TABLE 5-continued

|  | Example 22 |
|---|---|
| Sliding angle_water | 35° |
| Contact angle hysteresis | 10° |
| In-fold bending test (times) | 200k |
| Out-fold bending test (times) | 200k |

Preparation of Anti-Smudge Hard Coating Compositions with Anti-Microbial Ability Example 24

An anti-smudge hard coating composition with anti-microbial ability was prepared by blending 60% by weight of epoxy-containing POSS synthesized in Example 1, 40% by weight of 2-butanone, 8% by weight of diethylenetriamine and 2% by weight of anti-microbial additive KP-M22™.

The prepared anti-smudge hard coating composition was applied onto a TPU film. The TPU film coated with anti-smudge hard coating composition was put into an oven at 110° C. for 3 hours. This yielded a hard coating film with the anti-smudge and anti-microbial hard coating layer.

Example 25

To analyze the anti-microbial ability, the product synthesized in Example 24 was sent to the Hong Kong Standards and Testing Centre Ltd. Antimicrobial effectiveness against *Escherichia coli* (*E. coli*) and *Staphylococcus aureus* (SA) were tested referring to JIS Z 2801:2012, and the results were 99.89% and 99.94%, respectively.

The above-prepared hard coating film was examined and assessed on various methods given in Table 3. Some properties of the above sample (Example 24) were shown in Table 6.

TABLE 6

| Sample | | Example 25 |
|---|---|---|
| Antimicrobial effectiveness | against *E. coli* | 99.89% |
|  | against SA | 99.94% |
| Pencil Hardness |  | 6H |
| Scratch resistance (1 kg/cm$^2$) |  | 10 times pass |

Definitions

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises", "comprised", "comprising" and the like can have the meaning attributed to it in U.S. patent law; e.g., they allow for elements not explicitly recited, but exclude elements that are found in the prior art or that affect a basic or novel characteristic of the present invention.

Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the methods of preparation described herein, the steps can be carried out in any order without departing from the principles of the invention, except when a temporal or operational sequence is explicitly recited. Recitation in a claim to the effect that first a step is performed, and then several other steps are subsequently performed, shall be taken to mean that the first step is performed before any of the other steps, but the other steps can be performed in any suitable sequence, unless a sequence is further recited within the other steps. For example, claim elements that recite "Step A, Step B, Step C, Step D, and Step E" shall be construed to mean step A is carried out first, step E is carried out last, and steps B, C, and D can be carried out in any sequence between steps A and E, and that the sequence still falls within the literal scope of the claimed process. A given step or sub-set of steps can also be repeated. Furthermore, specified steps can be carried out concurrently unless explicit claim language recites that they be carried out separately.

Other definitions for selected terms used herein may be found within the detailed description of the present invention and apply throughout. Unless otherwise defined, all other technical terms used herein have the same meaning as commonly understood to one of ordinary skill in the art to which the present invention belongs.

It will be appreciated by those skilled in the art, in view of these teachings, that alternative embodiments may be implemented without undue experimentation or deviation from the spirit or scope of the invention, as set forth in the appended claims. This invention is to be limited only by the following claims, which include all such embodiments and modifications when viewed in conjunction with the above specification and accompanying drawings.

What is claimed is:

1. A modified, functionalized polymeric hard coating material represented by one of the following formulae for a bendable, transparent and photo/thermal curable coating film:

  Formula (1);

  Formula (2), wherein R$^1$ comprises at least one hydrophobic glycidyl-containing group, the at least one hydrophobic glycidyl-containing group is one or more selected from the group consisting of epoxidized olefins glycidyl and glycidyl ether;

R$^2$ comprises at least one hydrophobic photo/thermal curable crosslinking group;

R$^a$ comprises a substituent or an adduct derived from the R$^1$ or R$^2$ with a modifying reagent, and the substituent comprises at least one hydrophilic group or hydrophobic group; and the molar ratio of overall R$^1$ and R$^2$ groups to overall R$^a$ groups ranges from 1:79 to 79:1.

2. The modified, functionalized polymeric hard coating material of claim 1, wherein the at least one hydrophobic photo/thermal curable crosslinking group is one or more selected from the group consisting of amine, oxetane, episulfide, acrylate, methacrylate, thiol-acrylate, thiol-methacrylate, acrylamide, vinyl sulfide, vinyl ether, styrene, norborneyl, cyclopentadiene and acryloxypropyl.

3. The modified, functionalized polymeric hard coating material of claim 1, wherein the at least one hydrophilic group is one or more selected from the group consisting of polyethylene glycol 1000 (PEG 1000), polyethylene glycol 2000 (PEG 2000), N-[tris(hydroxymethyl)methyl]-2-aminoethanesulfonic acid salt, diphenylamine-4-sulfonate salt, N-methyl sulfanilic acid salt, 3-(cyclohexylamino)-1-propanesulfonic acid and 2-aminoethanesulfonic acid.

4. The modified, functionalized polymeric hard coating material of claim 1, wherein the modifying reagent is an organic chain structured compound structured as a linear or branched organic chain structure terminated with a reactive functional group at one terminal or pendant in structure.

5. The modified, functionalized polymeric hard coating material of claim 4, wherein the reactive functional group comprises hydroxyl, thiol, amine, carboxyl, anhydride, or any combination thereof.

6. A method for synthesizing the modified, functionalized polymeric hard coating material according to claim 1, the method comprising:

preparing polyhedral oligomeric silsesquioxane (POSS) represented by one of the formulae:

[R$^1$SiO$_{3/2}$]  Formula (3);

[R$^1$R$^2$SiO$_{3/2}$]  Formula (4), wherein R$^1$ comprises at least one hydrophobic epoxy or glycidyl-containing group; R$^2$ comprises at least one hydrophobic photo/thermal curable crosslinking group, and wherein the molar ratio of R$^1$ to R$^2$ ranges from 1:79 to 79:1, and wherein the POSS represented by Formula (4) is synthesized by hydrolytic co-condensation between R$^1$ and R$^2$; and substituting the R$^1$ in the Formula (3) or R$^1$ and R$^2$ in the Formula (4) by R$^a$ to obtain the modified, functionalized polymeric hard coating material represented by one of the following formulae:

[R$^1$R$^a$SiO$_{3/2}$]  Formula (1);

[R$^1$R$^2$R$^a$SiO$_{3/2}$]  Formula (2), wherein R$^a$ comprises a substituent or an adduct derived from the R$^1$ or R$^2$ with a modifying reagent, and the substituent comprises at least one hydrophilic or hydrophobic group, and wherein the molar ratio of overall hydrophobic groups to overall hydrophilic groups ranges from 1:79 to 79:1.

7. A composition for forming a bendable, transparent and photo/thermal curable coating, the composition comprising: 10 to 100 wt % of the modified, functionalized polymeric hard coating material of claim 1;

one or more photo/thermal initiator components in a range of 0.2 to 5 wt %;

at least one co-polymerizable reactive diluent in an amount of less than approximately 50 wt %, wherein the at least one co-polymerizable reactive diluent contains functional groups that co-polymerize with the modified, functionalized polymeric hard coating material; and one or more additives, wherein the composition is in liquid form before photo/thermal curing.

8. The composition of claim 7, wherein the photo initiator component is one or more selected from the group consisting of aromatic phosphine oxides, diaromatic propanones, sulfonium salts, iodonium salts, selenium salts, ammonium salts, phosphonium salts and transition metal complexes, while the thermal initiator component is one or more selected from the group consisting of organic peroxides, Lewis acid halides, transition metal complexes and transition metal carbine complexes.

9. The composition of claim 7, wherein the functional groups of the at least one co-polymerizable reactive diluent is a curable compound selected from one or more of hydroxyl, thiol, amine, carboxyl, anhydride, epoxy, epoxy cyclohexane, epoxypropoxy, cycloaliphatic epoxy, epoxidized olefins, glycidyl ether, oxetane, episulfide, acrylate, methacrylate, thiol-acrylate, thiol-methacrylate, acrylamide, vinyl sulfide, styrene, vinyl ether, styrene, norborneyl and cyclopentadiene.

10. The composition of claim 7, wherein the one or more additives further comprise two or more of:

a diluting solvent in a range of less than 90 wt %;

a water borne polymer emulsion in an amount less than 90 wt %;

silica in a range of less than 90 wt %;

a leveling agent in a range of greater less than 5 wt %; and an anti-microbial or anti-viral material in an amount less than 2 wt %.

11. The composition of claim 10, wherein the diluting solvent comprises aromatic hydrocarbon, ether, acetone, ketone, ester, amide, nitrile, alcohol and water.

12. The composition of claim 10, wherein the water borne polymer emulsion comprises polyurethane emulsion and styrene-butyl-rubber emulsion.

13. The composition of claim 10, wherein the anti-microbial or anti-viral material comprises silver, copper, zinc or titanium oxide nanoparticles, pyridinium salts and 4,5-dichloro-2-octyl-3-isothiazolone.

14. A method for preparing a coating on a substrate from the composition of claim 7, comprising:

synthesizing a modified, functionalized polymeric hard coating material;

mixing the modified, functionalized polymeric hard coating material with one or more photo/thermal initiators, at least one co-polymerizable reactive diluent and one or more additives to obtain a liquid mixture;

casting the liquid mixture to a substrate and drying the coated substrate at a temperature ranging from 25 to 120° C.;

photo/thermally curing the coated substrate under either visible light, UV irradiation exposure or at elevated temperature ranging from 25 to 200° C. to form the coating.

15. A bendable, transparent and photo/thermal curable coating film comprising a substrate and a hard coating layer deposited upon at least one side of the substrate, wherein the hard coating layer is formed through the polymerization of the composition of claim 7, wherein the content of the composition is in a range from 10 wt % to less than 100 wt %, and wherein the hard coating film has a pencil hardness of at least 6H on a flexible substrate, a pencil hardness of at least 9H on a rigid substrate, a light transparency of at least 85% and an antimicrobial effectiveness of at least 99%.

16. The bendable, transparent and photo/thermal curable coating film of claim 15, wherein the coating film has a flexibility and durability for folding to a bending radius of 2 mm over more than 100000 cycles without permanent deformation or fracture.

17. The bendable, transparent and photo/thermal curable coating film of claim 15, wherein the substrate is a flexible substrate comprising colorless polyimide (CPI), polyimide (PI), polyethylene terephthalate (PET), polyamide (PA), thermoplastic polyurethane (TPU) and ultra thin glass (UTG).

18. The bendable, transparent and photo/thermal curable coating film of claim 15, wherein the substrate is a rigid substrate comprising poly(methyl methacrylate) (PMMA), polypropylene (PP), polycarbonate (PC), metal, glass, wood and marble.

19. The bendable, transparent and photo/thermal curable coating film of claim 15, wherein the hard coating film has a thickness in a range of 1 to 100 μm.

* * * * *